United States Patent
Tvetene et al.

[19]

[11] Patent Number: 6,050,367
[45] Date of Patent: Apr. 18, 2000

[54] BI-DIRECTIONAL VEHICLE

[76] Inventors: Theodore Tvetene, 3801 Grand Ave., Billings, Mont. 59102; Donald Tvetene, 6844 S. Frontage Rd., Billings, Mont. 59101; Michael Tvetene, 12 Willow Bend Dr., Billings, Mont. 59102; Gregg Tvetene, 6844 S. Frontage Rd., Billings, Mont. 59101

[21] Appl. No.: 09/102,116

[22] Filed: Jun. 22, 1998

[51] Int. Cl.⁷ .................................................. B66F 9/22
[52] U.S. Cl. .................... 187/234; 187/237; 187/224; 180/21; 180/329
[58] Field of Search .................... 187/237, 222, 187/224, 234; 180/21, 329, 252, 253, 209

[56] References Cited

U.S. PATENT DOCUMENTS

| | | | |
|---|---|---|---|
| 610,177 | 9/1898 | Gaertner | 180/21 X |
| 641,897 | 1/1900 | Simms | 180/21 X |
| 991,485 | 5/1911 | Darrow | 180/21 X |
| 1,130,314 | 3/1915 | McKaig | 180/21 |
| 1,426,975 | 8/1922 | Fuscaldo | 180/21 |
| 2,641,480 | 6/1953 | Bancroft | 180/21 X |
| 3,347,558 | 10/1967 | Grimes et al. | 180/329 X |
| 3,656,572 | 4/1972 | Mercier | 180/21 |
| 3,700,059 | 10/1972 | Sutton | 180/21 X |
| 5,067,869 | 11/1991 | Reuss et al. | 187/237 X |
| 5,346,035 | 9/1994 | Ueda et al. | 180/329 |

*Primary Examiner*—Robert P. Olszewski
*Assistant Examiner*—Steven B. McAllister
*Attorney, Agent, or Firm*—Jacobson & Johnson

[57] ABSTRACT

A load stabilizing bi-directional vehicle having a steerable front and a steerable rear wheel and a pair of lateral wheels for maintaining the balance of the bi-directional vehicle. The bi-directional vehicles includes a first set of lift forks facing in a first direction and a second set of lift forks facing in a second direction and a drive module that is positionable in either the first direction or the second direction to enable the operator to face a first set of sod pallets as the first set of lift forks are driven into lifting engagement with the first set of sod pallets and to face a second set of sod pallets as the second set of lift forks are driven into lifting engagement with the second set of sod pallets therewith by rotating the driver module in the opposite direction

17 Claims, 4 Drawing Sheets

BI-DIRECTIONAL VEHICLE

FIELD OF THE INVENTION

This invention relates generally to a bi-directional vehicle and more specifically to a load stabilizing bi-directional sod hauling vehicle that includes a rotatable driving module to enable the user to face sod pallets as the pallets are loaded or unloaded from either end of the bi-directional vehicle.

BACKGROUND OF THE INVENTION

In the cutting and hauling of sod, the sod is first cut into strips that are rolled and placed onto a pallet which remains on the field. Another vehicle, usually a tractor, or the like, with a pallet fork, picks up the sod pallets and hauls the sod pallets to a truck which hauls the sod pallets to a location where the sod is unloaded. One of the time consuming tasks is the pickup of sod pallets from the field. Typically, the pallets are picked up one at a time and are hauled to a transport or storage area for delivery to a customer. With the present invention, four sod pallets can be picked up and hauled to the storage area, thus eliminating the considerable amount of time involved in removing the cut sod from the field.

SUMMARY OF THE INVENTION

Briefly, the present invention comprises a bi-directional vehicle having a steerable front and a steerable rear wheel and a pair of lateral wheels for maintaining the stability of the bi-directional vehicle. The bi-directional vehicle includes a first set of lift forks facing in a first direction and a second set of lift forks facing in a second direction and a drive module that is positionable in either the first direction or the second direction to enable the operator to face a first set of sod pallets as the first set of lift forks are driven into lifting engagement with the first set of sod pallets, and to face a second set of sod pallets as the second set of lift forks are driven into lifting engagement with the second set of sod pallets by rotating the driver module in the opposite direction between loading of the first and second pallets.

DESCRIPTION OF THE PREFERRED EMBODIMENT

Figure 1:
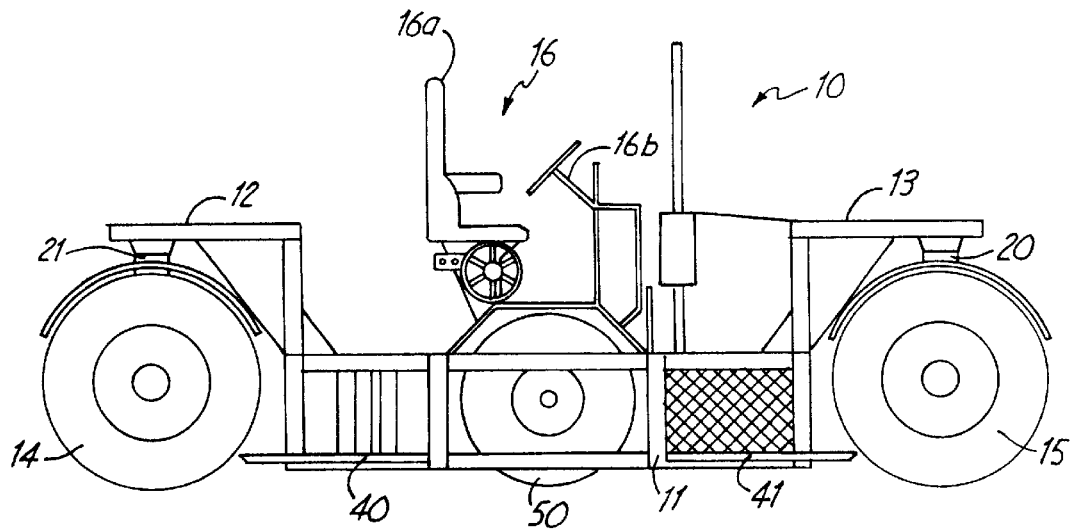
FIG. 1 is a side view of the bi-directional vehicle with the driving module facing in a first direction.

Referring to FIG. 1, reference numeral 10 generally identifies a bi-directional loading and hauling vehicle having a main frame comprising a first end section 12, a second end section 13 and an intermediate section 11. A first drive wheel 14 is pivotally mounted on first end section 12 though a pivot housing 21. Similarly, a second drive wheel 15 is pivotally mounted on second end section 13 through a pivot housing 20. A motor and hydraulic power source are housed in intermediate section 11 to power vehicle 10.

Figure 2:
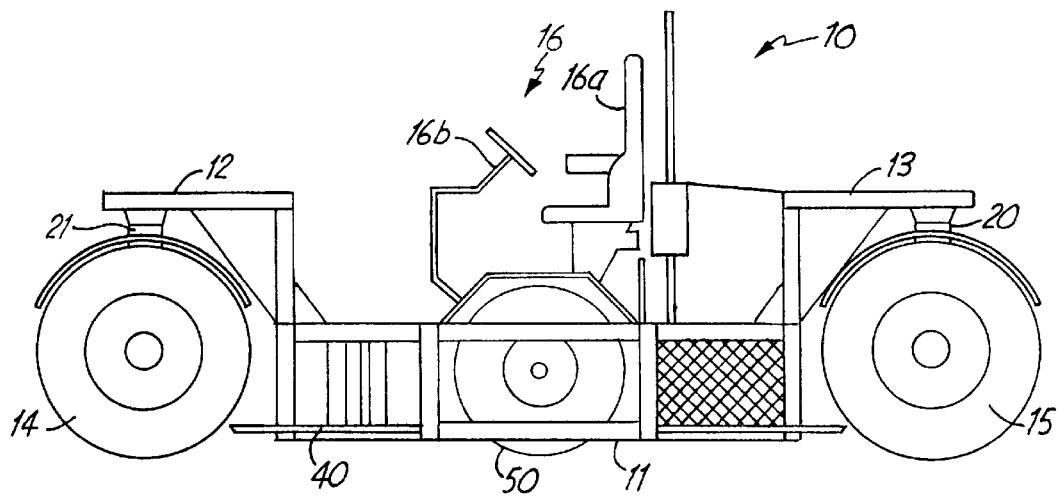
FIG. 2 is a side view of the bi-directional vehicle with the driving module facing in the opposite direction from the direction shown in FIG. 1.

A pivotable driving module 16 comprising a seat 16a and a steering wheel 16b are pivotally mounted to intermediate section 11 to permit driving module 16 to be rotated 180 degrees when the vehicle is driven in the opposite direction. FIG. 1 illustrates the driving module 16 facing in a first direction and FIG. 2 is an identical side view to FIG. 1 with the driving module 16 rotated 180 degrees to permit the driver to face in the opposite direction. As driver wheels 14 and 15 can be driven in either direction, the pivotal mounting of the driving module 16 on intermediate section 11 allows the driving module 16 to be positioned to face toward drive wheel 15 when the bi-drectional vehicle 10 is driven in a first direction, and can be positioned to face in the opposite direction toward drive wheel 14 when bi-directional vehicle 10 is driven in a direction opposite the first direction. That is, with the driving module in the right facing position shown in FIG. 1, the driver can drive the bi-directional vehicle in a forward direction with respect to the driver by driving from left to right, and when the driving module 16 is in the left facing position shown in FIG. 2, the driver can move the bi-directional vehicle in a forward direction with respect to the driver by driving the vehicle from right to left.

Figure 3:
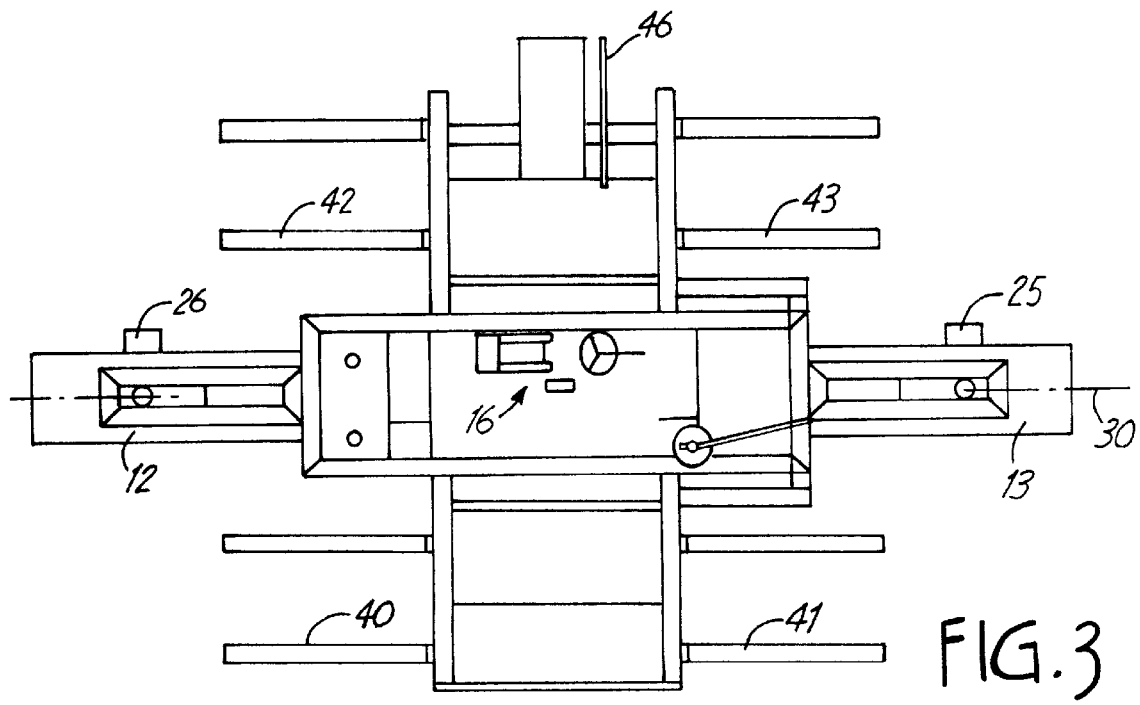
FIG. 3 is a top view of the bi-directional vehicle of FIG. 1 with the driving module facing in the first direction.
Figure 4:
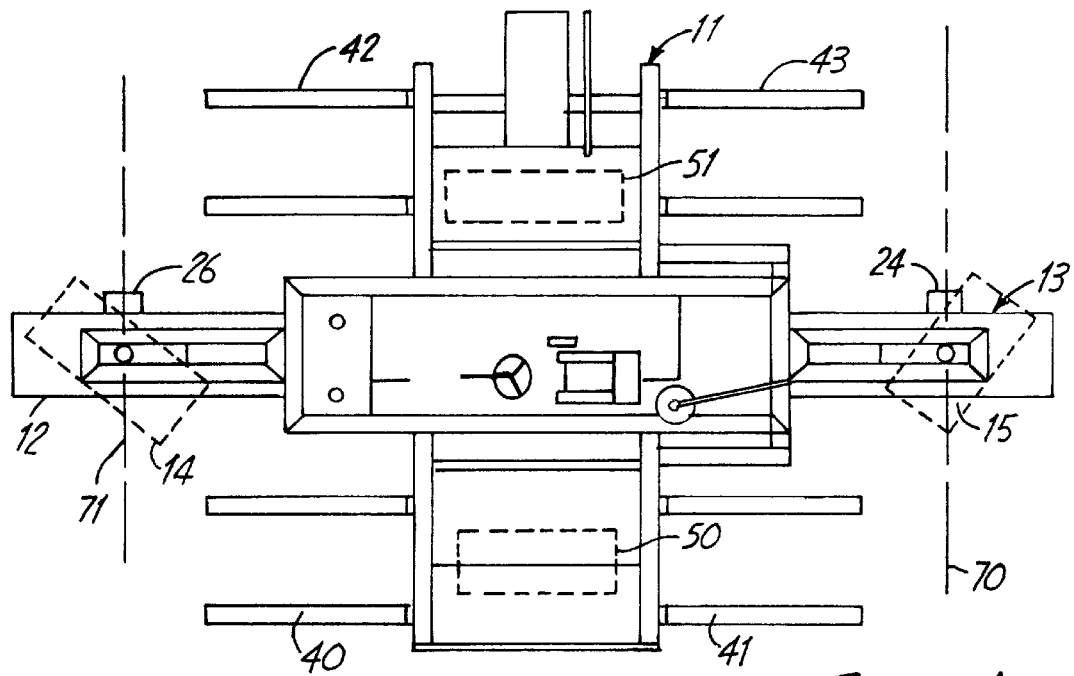
FIG. 4 is a top view of the bi-directional vehicle of FIG. 2 with the driving module facing in the opposite direction.

Referring to FIG. 3 and FIG. 4, the bi-directional vehicle 10 is shown in a top view with the driving module 16 facing in a first direction in FIG. 3 and facing in the opposite direction in FIG. 4. The top view illustrates that intermediate section 11 and end sections 12 and 13 form a cross-shape.

FIG. 3 shows intermediate frame 11 extends laterally outward from a central axis 30 that extends through end section 12 and end section 13. Connected to one side of intermediate section 11 is a first set of lift forks 41 and 43 each having two tines that face in a first direction with the tines oriented in a direction parallel to axis 30. Similarly, connected to the opposite side of intermediate section 11 is a second set of lift forks 40 and 42 each having two tines which face in direction opposite the tines on lift forks 41 and 43. The tines and the lift forks can be used independently to engage and lift objects for transporting the objects to another location.

Figure 5:
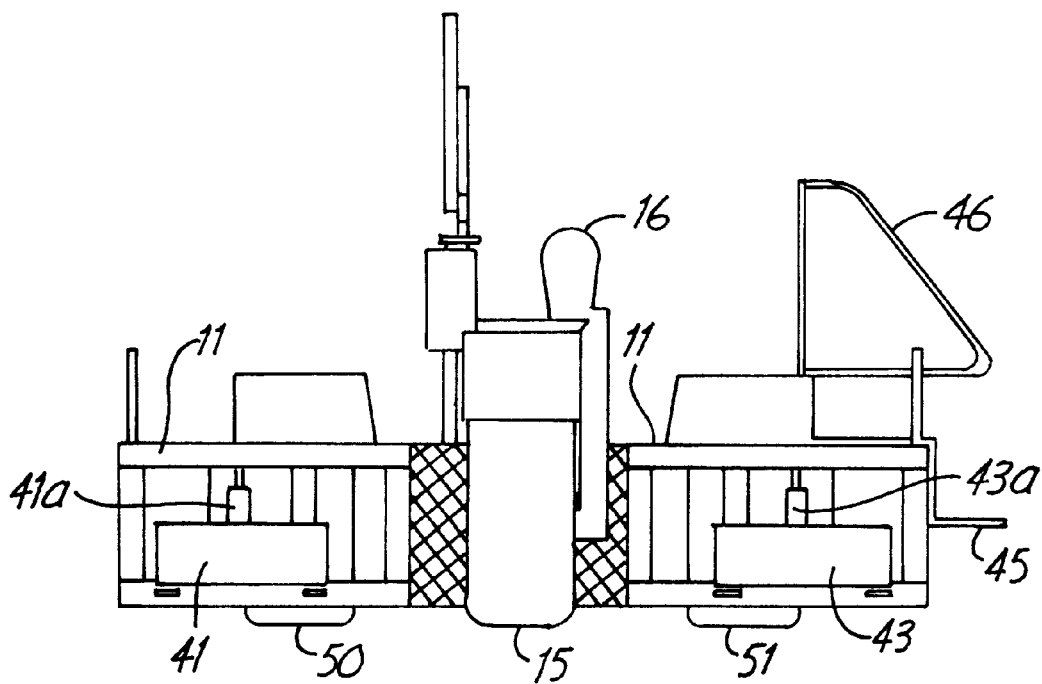
FIG. 5 is an end view of the bi-directional vehicle of FIG. 1.

In order to illustrate how the idler wheels maintain the balance of the bi-directional vehicle, reference should be made to FIG. 3 and to FIG. 5. FIG. 3 shows the intermediate sections 11 extending laterally outward from end sections 12 and 13. Located within the intermediate end sections are a set of idler wheels. FIG. 5 shows a first idler wheel 51 which is spaced laterally from one side of the drive wheel 15 and a second idler wheel 50 which is spaced laterally apart from drive wheel 15. The idler wheels in the present embodiment are not powered, but are independently free wheeling so as to provide support to prevent the vehicle 10 from tipping. By having the idler wheels spaced from the drive wheels 14 and 15 one provides laterally stability as well as distributing the weight of the vehicle and its load over a wider area.

FIG. 5 illustrates that lift fork 41 is powered by a two-way lift cylinder 41a to allow lift fork 41 to be raised and lowered and that lift fork 43 is similarity powered by a two-way lift cylinder 43a to allow lift fork 43 to be raised and lowered. Similarly, lift forks 40 and 42 are powered by two-way lift cylinders (not shown). The lift forks can be used to engage a pallet to lift the pallet to a position free of the ground so that the pallet with the load of sod thereon can be hauled to another location. That is, the vehicle 10 can be driven forward until the tines of lift forks 41 and 43 engage two pallets of sod or the like. Once engaged, the hydraulic lift cylinders are activated to lift the pallets upward where vehicle 10 can transfer the pallets to a different location. However, once lift forks 41 and 43 are loaded, the driver then rotates driving module 16 to the opposite direction and engages the tines of lift forks 40 and 42 with additional pallets which are then lifted off the ground by their respective two-way hydraulic cylinders. Thus, the operator can load four pallets of sod onto vehicle 10 in one trip. As the intermediate section 11 is low to the ground and the pallets can be carried a few inches off the ground, one can ensure that the center of gravity of both the vehicle and the vehicle with load remains relatively low thus minimizing the opportunity for the vehicle to tip if it is driven on a side hill.

FIG. 5 illustrates that bi-directional vehicle 10 includes a step 45 and a rail 46 to enable a person to climb thereon. That is, a person can grasp rail 46 and step on step 45 to enable a person to obtain access to the seat in driving module 16.

Figure 6:
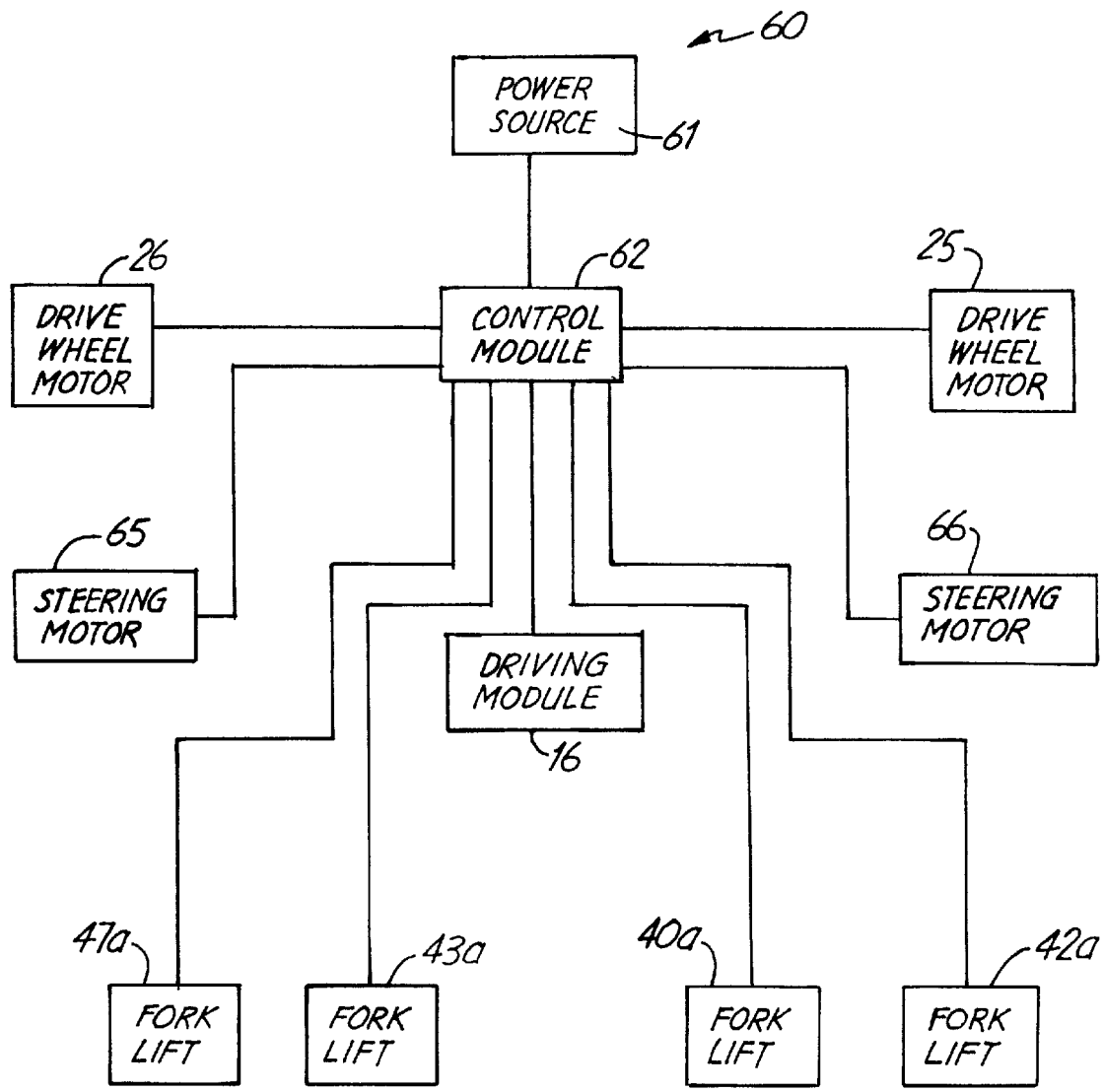
FIG. 6 is a block diagram of the control system for the bi-directional vehicle.

FIG. 6 shows a block diagram of the control system 60 for operation of the bi-directional vehicle 10. Control system 60 includes a power source 61, which is typically a source of pressurized hydraulic fluid, and a control module 62 that is operated by the driver of the bi-directional vehicle 10. Control module 62 is fixedly mounted on the driving module 16 so that the operator can have access to the control module 62 regardless of the direction the driving module 16 faces.

Control module 62 can direct power to a first drive wheel motor 25 (FIG. 3) that drives wheel 15 or a second drive wheel motor 26 (FIG. 3) that drives drive wheel 14. As drive wheel motors 25 and 26 are reversible, one can rotate the drive wheels 14 and 15 in either direction.

In order to steer vehicle 10, control module 62 can direct power to steering motor 65 and steering motor 66 which pivots the drive wheel 14 about pivot housing 21 and drive wheel 15 about pivot housing 20. In the present embodiment, the power source is arranged so that the steering motor operates to simultaneously turn the drive wheels in opposite directions to thereby facilitate the turning of the vehicle 10. To illustrate the opposite turning directions, reference should be made to FIG. 4 which shows wheel 14 and wheel 15 in dashed lines with both wheels turned to indicate how the wheels can be turned in unison in opposite directions to steer the vehicle.

Through the use of control module 62, the operator can also direct hydraulic power to the fork lift drive motors 41a, 43a, 40a and 42a, to enable the fork lifts 41, 43, 40 and 42 to be raised or lowered independently.

Control module 62 also contains controls to allow the driving module 16 to be rotated 180 degrees. Control module 62 contains a reversing valve so that wheels will turn in the same direction with respect to the steering wheel regardless of the direction the driver is facing.

Thus, with the present invention, the driver can drive the vehicle forward until the tines of one set of lift forks are engagement with a load. The operator then lifts the lifts forks and rotates the driving module 180 degrees so that the initial front of the vehicle now becomes the back of the vehicle and vice-versa In this condition, the driver can move the vehicle to a second location where the two remaining lift forks can be used to engage a load and then elevated to carry the load to a third remote location.

Once those in the art have seen our invention, they will realize that the embodiment shown has both wheels 14 and 15 powered; however in certain applications one may wish to power only one of the wheels. Also, the lateral wheels in the intermediate sections are unpowered, however, in other applications, one could provide power to the lateral wheels 50 and 51, and not power either of the end wheels 14 and 15. In this condition, the steering could be accomplished by the differential speed between the lateral wheels. That is, one lateral wheel would rotate faster than the other.

A reference to FIG. 3 illustrates the compactness of the present invention that provides a more stable lifting and hauling vehicle than conventional front end loaders. That is, the conventional front end loaders have tines cantilevered out in front of the support wheels of the vehicle thus making the vehicle susceptible for tipping if the load becomes too heavy. With the present invention the loads on the pallets are balanced with each other and the wheels of the vehicle are at least partially outside the lifting plane. That is, FIG. 4 illustrates that the ends of the tines on lift forks 41 and 43 terminate in a plane that is inside axis 70 extending through the pivot point on drive wheel 15, and that the tines of lift fork 40 and 42 are within the axis 71 extending through the pivot point on wheel 14. Consequently, the tendency of the vehicle to pitch or tip forward is eliminated because the loads are placed between the wheels 14 and 15. In addition to prevent tipping of the loaded vehicle in the frontal direction, the placement of idler wheels 50 and 51 laterally with each centrally aligned with its respective drive wheel centers the loads on lift forks 40 and 41 about wheel 50 and the load on lift forks 42 and 43 about idler wheel 51. Thus, the idler wheels inhibit lateral tipping of the vehicle through load placement with respect thereto plus the balance of the loads about the central axis 30 of the vehicle.

We claim:

1. A bi-directional vehicle for hauling multiple pallets comprising:

a frame, said frame having a first end section, a second end section and an intermediate section;

a first drive wheel pivotally mounted on said first end section of said frame;

a second drive wheel pivotally mounted on said second end section of said frame with said first drive wheel and said second drive wheel located along a first axis;

a first idler wheel supported by said intermediate section, said first idler wheel spaced laterally from said first axis and a second idler wheel supported by said intermediate section with said second idler wheel located on the opposite side of said first axis to prevent the vehicle from tipping about said first axis;

a motor for propelling said vehicle;

a first set of fork lifts mounted on a first side of said intermediate section;

a second set of fork lifts mounted on a second side of said intermediate section, with said first set of fork lifts facing in a first direction and said second set of fork lifts facing in an opposite direction;

a driving module positioned on said frame, said driving module pivotally mounted on said frame so that said driving module can be positioned to face toward said first drive wheel when said bi-directional vehicle is driven in a first direction and can be positioned to face in the opposite direction when said bi-directional vehicle is driven in a direction opposite said first direction.

2. The bi-directional vehicle of claim 1 wherein each of said set of fork lifts includes a hydraulic cylinder for raising and lowering said set of fork lifts.

3. The bi-directional vehicle of claim 1 wherein said driving module includes a seat and a steering wheel.

4. The bi-directional vehicle of claim 1 including a control system for simultaneously turning said first drive wheel in a first direction while turning said second drive wheel in a second direction.

5. The bi-directional vehicle of claim 1 including a hydraulic motor for propelling said drive wheels.

6. The bi-directional vehicle of claim 1 wherein a second axis through said idler wheels is perpendicular to said first axis.

7. The bi-directional vehicle of claim 1 wherein said first set of fork lifts are located on one side of said idler wheels and said second set of fork lifts are located on the opposite side of said idler wheels.

8. The bi-directional vehicle of claim 1 wherein said end lift forks are located within a first plane extending through a pivotal housing for the first drive wheel and a second plane extending through a pivotal housing for the second drive wheel to thereby prevent tipping of said vehicle.

9. A bi-directional vehicle for loading from opposite directions comprising:
   a frame, said frame having a first end section, a second end section and an intermediate section having a first side and a second side;
   a first set of fork lifts mounted on the first side of said intermediate section and a second set of fork lifts mounted on the second side of said intermediate section;
   a first wheel pivotally mounted on said first end section of said frame;
   a second wheel mounted on said second end section of said frame with said first wheel and said second wheel located along a first axis;
   a pair of wheels mounted on the opposite sides of said intermediate section to prevent the vehicle from tipping about said first axis;
   a motor for propelling said vehicle; and
   a driving module positioned on said frame, said driving module pivotally mounted on said frame so that said driving module can be positioned to face in a first direction when said bi-directional vehicle is driven in the first direction and can be positioned to face in the opposite direction when said bi-directional vehicle is driven in the opposite direction.

10. The bi-directional vehicle of claim 9 wherein each of said set of fork lifts includes a hydraulic cylinder for raising and lowering said set of fork lifts.

11. The bi-directional vehicle of claim 10 wherein said driving module includes a seat and a steering wheel.

12. The bi-directional vehicle of claim 11 including a control system for simultaneously turning said first drive wheel in a first direction while turning said second drive wheel in a second direction.

13. The bi-directional vehicle of claim 12 including a hydraulic motor for propelling said first wheel and said second wheel.

14. The bi-directional vehicle of claim 13 wherein a second axis through said pair of wheels is perpendicular to said first axis.

15. The bi-directional vehicle of claim 14 wherein said first set of fork lifts are located on one side of said pair of wheels and said second set of fork lifts are located on the opposite side of said pair of wheels.

16. The bi-directional vehicle of claim 15 wherein said end sections of said frame are off-set from said intermediate section of said frame to enable said intermediate section to maintain a low center of gravity for said bi-directional vehicle.

17. The bi-directional vehicle of claim 16 including a step and a handrail.

* * * * *